C. D. FOX.
Combined Plow and Seeder or Planter.
No. 230,627. Patented Aug. 3, 1880.
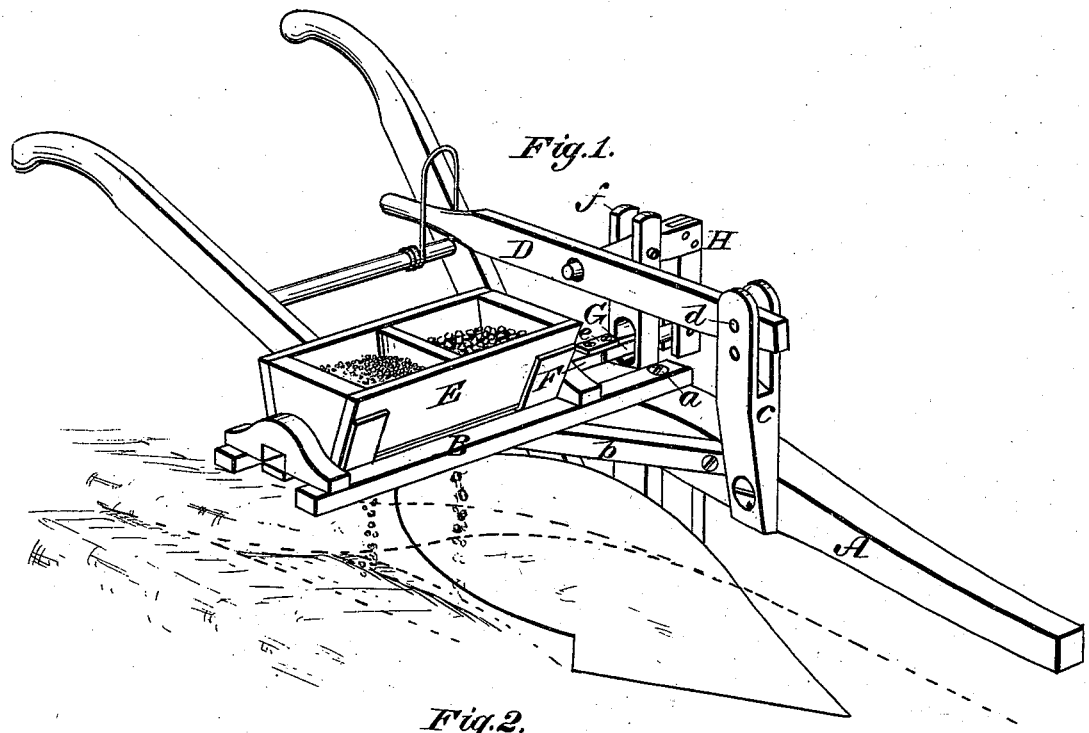
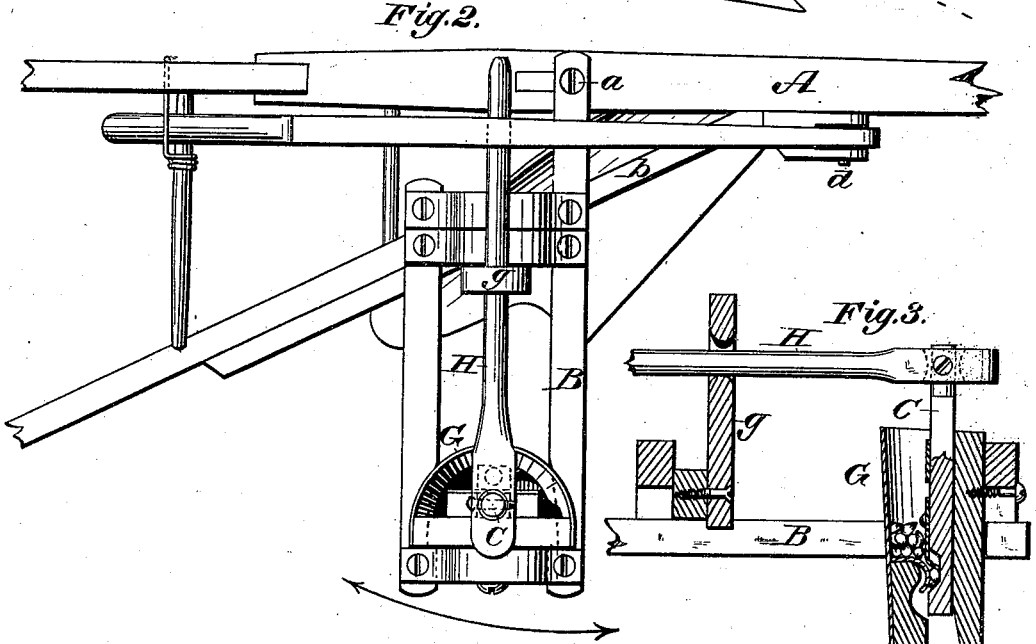
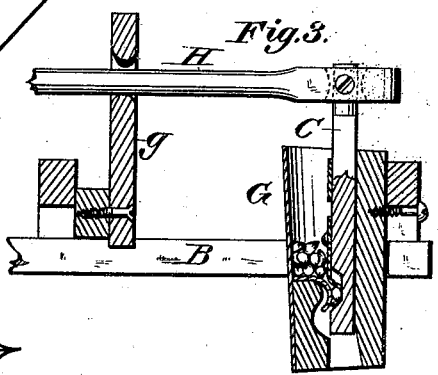
Witnesses:
Donn P. Twitchell
William W. Dodge
Inventor:
C. D. Fox
By Dodge & Son
Attys

UNITED STATES PATENT OFFICE.

CYRUS D. FOX, OF ROSCOE, ILLINOIS, ASSIGNOR OF ONE-HALF OF HIS RIGHT TO WILLIAM H. WHEELER, OF BELOIT, WISCONSIN.

COMBINED PLOW AND SEEDER OR PLANTER.

SPECIFICATION forming part of Letters Patent No. 230,627, dated August 3, 1880.

Application filed December 16, 1879.

*To all whom it may concern:*

Be it known that I, CYRUS D. FOX, of Roscoe, in the county of Winnebago and State of Illinois, have invented certain Improvements in Combined Plow and Seeder or Planter, of which the following is a specification.

My invention relates to seeding and planting attachments for plows; and it consists in a frame for supporting the seeding and planting devices capable of being adjusted with relation to the plow so as to deliver the seed at any desired point or points; and it further consists in mechanism for operating said seeding or dropping devices, as hereinafter described.

In the accompanying drawings, Figure 1 represents a perspective view of a plow with my improvements applied, the seeding mechanism being shown in position; Fig. 2, a plan view of the same with the planting or dropping mechanism in position; Fig. 3, a vertical central section taken through the dropping mechanism.

The object of this invention is to produce a cheap and simple attachment for the common plow now in use, which may be readily applied thereto, and which may be quickly converted from a seeder to a planter, and vice versa.

To this end I provide a horizontal rectangular frame for supporting the seeding or dropping mechanism, and pivot said frame at its inner end to the plow-beam in such manner that the frame may be swung horizontally in the arc of a circle toward or away from the beam, and thereby cause the seeding or dropping devices to deliver the seed in the furrow, along the crest of the slice, or upon the surface of the soil already turned, as circumstances may require.

Any convenient form of seeding or dropping mechanism may be placed upon the frame, a suitable hand-lever being provided by which to operate the same.

Referring to the drawings, A is the beam of the plow, and B the frame which carries the seeding or dropping mechanism. As shown more clearly in Fig. 2, this frame consists simply of four timbers arranged in rectangular form, the forward piece extending inward beyond the rest and being attached to the beam by a screw or bolt, $a$, which serves as a pivot or center on which the frame may be swung horizontally in any direction. The frame is supported upon a cross-brace, $b$, which extends from the beam to the outer stilt or handle, as shown, and which serves to support the frame and its parts in any position to which it may be adjusted.

Although, as stated, any well-known forms of seeding or dropping mechanism may be employed, I prefer to use a seeder having a longitudinally-reciprocating feed-slide, preferably of the peculiar construction described in my application filed on the 6th day of January, 1879, and a dropping mechanism of the construction shown in Figs. 2 and 3, consisting of a recessed plunger, C, moving vertically through an opening in the bottom of a hopper or seed-box, as shown, these devices, however, constituting no part of my present invention. These devices are placed upon the frame B one at a time, and are so used, both being operated, however, by a vibrating lever, D, the forward end of which is pivoted in an upright, $c$, secured to the plow-beam, the pivot-pin $d$ being adjustable vertically to raise or lower the operating end of the lever to suit the operator.

When the seeding mechanism is to be used the seed-box or hopper E is placed upon the frame B, as shown in Fig. 1, it being of a length to exactly fill the interior of the frame, and being secured in place in any convenient manner.

To operate the feed-slide F its inner end is connected by a link or flexible connection, $e$, to a short rod or pitman, G, which is, in turn, connected with the depending arm of an elbow-lever, H, pivoted in an upright, $f$, secured to the beam. The horizontal arm of the elbow-lever H has its free end passed through a hole in the main operating-lever D, by vibrating which the feed-slide may be operated.

If desired, the seed-box or hopper E may be divided into two parts and used to deposit two kinds of seed simultaneously, which is frequently desirable. By simply swinging the frame B and its attendant parts horizontally to or from the beam the seeder may be caused to deliver the seed along the crest of the furrow, or to deliver one kind of seed at that point and another upon the surface, as desired.

To convert the machine into a planter it is only necessary to remove the hopper E, with its slide, and the elbow-lever H, substitute the hopper G, which is secured to the outer end of the frame B, and attach the upright g to the frame near its inner end. This upright g serves as a fulcrum for a horizontal lever, H, the outer end of which is connected with the upper end of the plunger C, while the inner end is passed through the main operating-lever D, as shown in Fig. 2, thus enabling it to be operated by the same movement and in the same manner as the seeder. By adjusting the frame horizontally the point of delivery of the seed can be regulated as before, it being customary to deposit them in the furrow in planting, the lap of the succeeding slice serving to cover the seed. By depositing the seed nearer to or farther from the bottom of the furrow the depth to which they are covered is regulated.

With the devices constructed and applied as above described, the work of two expensive machines is performed in a thoroughly satisfactory manner at the time of plowing the field, thus saving at once the expense of such machines and the time required for their use.

It is apparent that instead of the elbow-lever H being mounted in a separate upright it may be pivoted directly to the end of the seed-box, and that similar modifications of other details may be made, the essential feature of my invention being the adjustable frame and the common operating-lever.

It is likewise obvious that instead of arranging the frame B to swing in the manner described it may be made to slide at right angles to the plow-beam.

The screw or bolt a, which serves as a pivot for the frame B, may be made to clamp the frame in its adjustable position by being tightened, or may be permanently tightened to produce friction sufficient to prevent the movement of the frame except upon the application of a considerable force; or any other well-known form of clamping or locking device may be employed for the purpose.

I am aware that a planter has been patented in which, for the purpose of varying the space between rows, the seed-hoppers and the plows were made laterally adjustable, the plows being in all cases and necessarily adjusted to correspond with the adjustment of the hoppers. Such arrangement I do not claim.

Having thus described my invention, what I claim is—

1. In combination with a plow, a frame to receive and support a seeding mechanism, hinged or pivoted to swing in a horizontal plane to and from the plow-beam, substantially as described.

2. In combination with a plow, a seeding or planting mechanism attached thereto, substantially in the manner shown and described, whereby the said mechanism may be adjusted to deliver seed in the furrow, along the crest of the slice, upon the surface, or at intermediate points.

3. In combination with a plow having a frame adapted to receive interchangeably a seeding and a planting mechanism, an operating-lever, D, common to both mechanisms.

4. In combination with a plow provided with a horizontally-adjustable frame carrying a seeding or planting mechanism, an operating-lever connected with said mechanism by a flexible connection, whereby the adjustment of the frame is permitted without interfering with the operation of the seeding or planting devices.

5. In combination with a mold-board plow, a divided hopper having independent delivery-openings at different distances laterally from the mold-board, and provided with seed-delivering devices, whereby it is adapted to deliver simultaneously two kinds of seed at different distances from the mold-board, substantially as described.

CYRUS D. FOX.

Witnesses:
W. H. WHEELER,
O. H. ORTON.